(12) United States Patent
Pyke et al.

(10) Patent No.: US 10,838,106 B2
(45) Date of Patent: Nov. 17, 2020

(54) METHOD AND SYSTEM FOR GEOREFERENCING UNDERGROUND DATA

(71) Applicant: Peck Tech Consulting Ltd., Montreal (CA)

(72) Inventors: Sandy Wayne Pyke, Saint-Constant (CA); Joshua Alexander Marshall, Kingston (CA); Nicholas James Lavigne, Seattle, WA (US); Unal Artan, Toronto (CA)

(73) Assignee: Peck Tech Consulting Ltd., Montreal (CA)

( * ) Notice: Subject to any disclaimer, the term of this patent is extended or adjusted under 35 U.S.C. 154(b) by 529 days.

(21) Appl. No.: 15/558,488

(22) PCT Filed: Jan. 6, 2017

(86) PCT No.: PCT/CA2017/000002
§ 371 (c)(1),
(2) Date: Sep. 14, 2017

(87) PCT Pub. No.: WO2017/117667
PCT Pub. Date: Jul. 13, 2017

(65) Prior Publication Data
US 2018/0081079 A1    Mar. 22, 2018

Related U.S. Application Data

(60) Provisional application No. 62/276,074, filed on Jan. 7, 2016.

(51) Int. Cl.
*G01V 11/00*    (2006.01)
*G01S 17/89*    (2020.01)
(Continued)

(52) U.S. Cl.
CPC ............ *G01V 11/002* (2013.01); *E21F 17/00* (2013.01); *G01C 7/06* (2013.01); *G01C 15/002* (2013.01);
(Continued)

(58) Field of Classification Search
CPC ....... G01C 7/06; G01C 15/002; G01S 7/4808; G01S 13/885; G01S 17/86; G01S 13/74;
(Continued)

(56) References Cited

U.S. PATENT DOCUMENTS 6,009,359 A * 12/1999 El-Hakim ............. G01C 11/02
348/135
6,608,913 B1    8/2003 Hinton et al.
(Continued)

FOREIGN PATENT DOCUMENTS

EP    2660560 A1    11/2013
WO    WO-2011/097018 A1    8/2011

*Primary Examiner* — Stephanie E Bloss
(74) *Attorney, Agent, or Firm* — Leydig, Voit & Mayer, Ltd.

(57) ABSTRACT

Known georeferencing techniques require input in the form of manually-chosen anchor points or dense surveyed data. The present invention is an improved method and system for georeferencing underground geometric data. The method comprises (a) visiting at least two control points; (b) obtaining information about each of the at least two control points using scanning means; (c) recording the information about the at least two control points into a computer processor; and (d) performing a best-fit transformation to the recorded information. Preferably, the scanning means comprises laser scanners and at least two radio-frequency identification (RFID) tags. However, other technologies, such as retro-reflective LIDAR targets, Wi-Fi access points or bar codes (Continued)

and a bar code reader may also be used. In addition, sonar, radar, flash LIDAR, MEMS LIDAR, or any other similar technology could be used.

22 Claims, 3 Drawing Sheets

(51) Int. Cl.
  *G01S 17/86* (2020.01)
  *E21F 17/00* (2006.01)
  *G01S 13/74* (2006.01)
  *G01C 7/06* (2006.01)
  *G01S 13/88* (2006.01)
  *G01C 15/00* (2006.01)
  *G01S 7/48* (2006.01)
  *G06K 7/10* (2006.01)
  *G01S 13/86* (2006.01)

(52) U.S. Cl.
  CPC ............ *G01S 7/4808* (2013.01); *G01S 13/74* (2013.01); *G01S 13/885* (2013.01); *G01S 17/86* (2020.01); *G01S 17/89* (2013.01); *G06K 7/10366* (2013.01); *G01S 13/86* (2013.01)

(58) Field of Classification Search
  CPC ....... G01S 17/89; G01S 13/86; G01V 11/002; G06K 7/10366; E21F 17/00
  See application file for complete search history.

(56) References Cited

U.S. PATENT DOCUMENTS

| | | | |
|---|---|---|---|
| 10,539,956 B2 | 1/2020 | Baiden | |
| 2006/0080035 A1 | 4/2006 | Daubert et al. | |
| 2008/0252449 A1* | 10/2008 | Colvero | G01V 15/00 340/540 |
| 2012/0257792 A1 | 10/2012 | Simon | |
| 2013/0096873 A1* | 4/2013 | Rosengaus | G01C 15/002 702/151 |
| 2013/0321131 A1* | 12/2013 | Tucker | G06K 7/10366 340/10.1 |
| 2014/0210856 A1* | 7/2014 | Finn | G06K 9/00671 345/633 |
| 2015/0170368 A1* | 6/2015 | Janky | G06K 9/00 382/103 |

\* cited by examiner

US 10,838,106 B2

METHOD AND SYSTEM FOR GEOREFERENCING UNDERGROUND DATA

RELATED APPLICATION

This application is a national phase of PCT/CA2017/000002, filed on Jan. 6, 2017, which claims the benefit of U.S. Provisional Application No. 62/276,074, filed on Jan. 7, 2016. The entire contents of those applications are hereby incorporated by reference.

TECHNICAL FIELD OF THE INVENTION

The invention relates to a method and system for georeferencing underground data.

BACKGROUND

Most underground mines use a mine coordinate system to consistently represent all surveyed quantities (e.g., the precise location of all mine tunnels, features, infrastructure, etc.). In order to track and locate the position of underground equipment, laser scanning technology may be used. However, the scanner, on its own, has no way of knowing its location within an externally-defined co-ordinate system.

One known error in positioning systems is drift error. Drift error refers to error in a scanner's estimated location that accumulates with time and/or distance. Drift error results in a distorted output point cloud—a problem that is not corrected by simply aligning the point cloud with a mine coordinate system. The fact that the map contains drift error is an important distinction when compared to stationary LIDAR scans, which are collected from a stationary platform, as it means that a rigid transformation cannot be simply applied in order to georeference the data. If a rigid transformation were performed, it would result in a map that was aligned with the external coordinate system but may still contain discrepancies.

Drift error is inherent in any mobile system that computes its location incrementally. On the Earth's surface, drift error is commonly corrected using Global Position System ("GPS") as a non-drifting reference. However, systems being used underground cannot use GPS in this manner because there is no GPS satellite signal underground. Nevertheless, there are known methods for correcting drift error in underground operations (e.g., F. Lu and E. Milios, "Globally consistent range scan alignment for environment mapping", in *Autonomous Robots*, 4, 1997) for self-registration that make use of closed scan loops to correct the error. However, closed scan loops are difficult to make work without manual input and because they are often impractical in real mines.

One known method of georeferencing uses stationary scanners, in which data from stationary scanners is georeferenced. Georeferencing of this type is typically done by installing a number of targets or prisms into the scan area which are then surveyed to obtain precise coordinates. These targets are visible in the scan data, making it possible to align the scan with the survey, either manually or by some automated means. This method can also be applied to underground, stationary scans as well. Newer scanners also have the ability to use survey-grade GPS for georeferencing above ground (where GPS signals are available).

Another known method is land mobile LIDAR mapping systems, which are commercially available from manufacturers such as Optech, Riegl, Trimble, etc. and are intended for outdoor use. These mapping systems are vehicle-mounted and use high precision GPS in combination with inertial navigation systems ("INS") to locate themselves and georeference scans. The combination of GPS and INS are commonly used in guiding ships and airplanes. Some systems also have the ability to use surveyed laser targets for georeferencing, similar to the stationary case. Since the above systems are dependent on the GPS for positioning and error correction, they are not intended to operate in environments where GPS signals are unavailable. The use of INS, however, allows users to operate for varying distances without a GPS signal. This is intended for short stretches such as road tunnels, urban environments, and other areas that may not have reliable GPS coverage. In rare instances, INS can be used to map a subway rail tunnel. For example, a unit can be powered up and allowed to initialize within GPS coverage on the surface, then brought underground, and installed on a rail vehicle while powered. However, such a method is not practical for long-term or deep underground use.

RFID refers to a family of technologies providing radio frequency identification. RFID tags are small and cheap objects that can be read by radio frequency by RFID readers. Each tag has a unique serial number that is analogous to a barcode number that can be read by the reader. Tags can be read without physical contact and without line-of-sight between the tag and reader.

In mobile robotics, the "data association problem" is the problem of deciding which acquired measurements (or which parts of a map) correspond to which known points in the real world. RFID is sometimes used here to provide a "hint", which is often combined with some other form of recognition (e.g., W. Gueaieb and Md. S. Miah, "An intelligent mobile robot navigation technique using RFID technology" in *IEEE Trans. Instrum. Meas.*, vol. 57, no. 9 pp. 1908-1917, September 2008).

Yet another known method uses a mobile mapping setup using scanned data from an underground mine and existing mine survey information to georeference the scan and correct the drift error (see M. Bosse and R. Zlot, "Efficient large-scale 3D mobile mapping and surface reconstruction of an underground mine", in *Proceedings of the Interntional Conference on Field and Service Robotics (FSR)*, Matsushima, Japan, 16-19 Jul. 2012). The method disclosed by Bosse and Zlot includes the steps of: (i) generating an open-loop scan of a mine; (ii) performing a closed-loop error correction; and (iii) performing a nonrigid registration of this resulting point cloud to a large set of surveyed points. However, this method has a disadvantage of requiring input in the form of manually-chosen anchor points (typically by a user clicking points on a computer display and manually defining them to be associated). However, since the purpose of these anchor points is to solve the association problem, it would be feasible to replace manually chosen points with installed RFID tags or similar means of uniquely recognizing places. This could hypothetically be developed into an alternate automated means of creating georeferenced underground scans. However, this hypothetical new method would have the disadvantage of requiring dense surveyed data in all areas before it's possible to georeference there. This makes it less useful for the case where the goal is to use the scanner to "fill in gaps" and reduce the total amount of survey work necessary.

An improved georeferencing system and method is therefore needed to overcome the above disadvantages.

SUMMARY OF THE INVENTION

The present invention therefore seeks to provide:
an improved georeferencing system that aligns laser scanned data with an external coordinate frame, and
corrections of accumulated drift error.

The present invention seeks to provide a system and method where scanned data is registered using a sparse set of surveyed control points, i.e., a point that is physically present in a mine. This method of the present invention has two main elements:
1. control point (tag) profiling, wherein a scanner is precisely aligned with a known control point and a snapshot of what the area looks like is captured (the snapshots are compiled into a database, with one snapshot per control point); and
2. a nonrigid position and heading set registration of the scanned data control points.

In addition, the current invention can operate in two distinct operating modes: (i) open loop mapping and closed loop mapping. Since the control points have known coordinates, each control point need only be scanned once to close the loop (i.e., provide corrections for georeferencing and nonrigid alignment).

In a first broad embodiment, the invention therefore seeks to provide a method for georeferencing underground geometric data, the method comprising:
 (a) visiting at least two control points;
 (b) obtaining information about each of the at least two control points using data acquiring means;
 (c) recording the information about the at least two control points into a computer processor; and
 (d) aligning other scanned data to the recorded data.

Preferably, aligning the other scanned data to the recorded data comprises performing the best-fit transformation on the other scanned data.

Preferably, the best-fit transformation comprises applying a least-squares method to the other scanned data.

Preferably, the data acquiring means comprises at least one laser scanner and at least two radio-frequency identification (RFID) tags.

Alternatively, the data acquiring means comprises at least one laser scanner and at least two of the following elements: RFID tags; retro-reflective LIDAR targets; Wi-Fi access points; bar codes and a bar code reader; sonar; calibrated cameras; radar; flash LIDAR; and MEMS LIDAR.

Preferably, the information about the control point comprises the position (X,Y,Z coordinates) of the control point.

Preferably, the computer processor comprises a computer-readable data storage medium.

Preferably, the at least two control points comprise a plurality of control points.

In a second broad embodiment, the invention therefore seeks to provide a system for georeferencing underground geometric data, the system comprising:
 (a) visiting at least two control points;
 (b) data acquiring means for obtaining information about each of the at least two control points; and
 (c) computer processor means constructed and arranged to:
  (i) record the information about the at least control points; and
  (ii) align other scanned data to the recorded data.

Preferably, aligning the other scanned data to the recorded data comprises performing the best-fit transformation on the other scanned data.

Preferably, performing the best-fit transformation comprises applying a least-squares method to the other scanned data.

Preferably, the data acquiring means comprises at least one laser scanner and at least two radio-frequency identification (RFID) tags.

Alternatively, the data acquiring means comprises at least one laser scanner and at least two of the following: elements RFID tags; retro-reflective LIDAR targets; Wi-Fi access points; bar codes and a bar code reader; sonar; calibrated cameras; radar; flash LIDAR; and MEMS LIDAR.

Preferably, the information about the control point comprises the position of the control point.

Preferably, the computer processor means comprises a computer-readable data storage medium.

Preferably, the at least two control points comprise a plurality of control points.

DESCRIPTION OF THE DRAWINGS

Reference is made to the following drawings wherein.

DETAILED DESCRIPTION OF THE INVENTION

Figure 1:
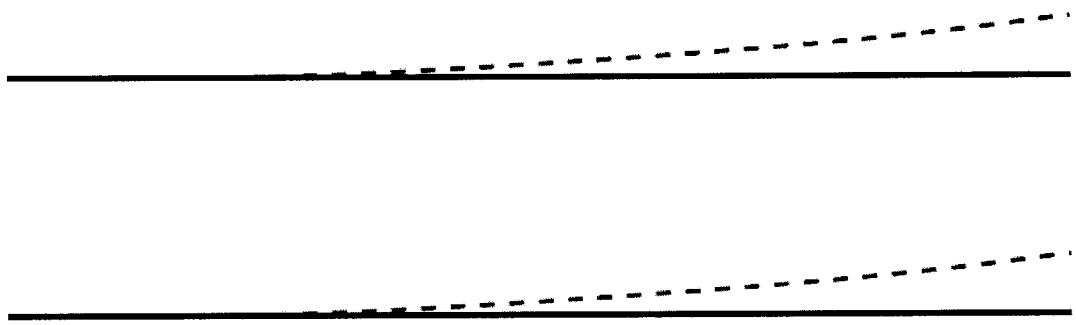
FIG. 1 is a schematic showing the effect of drift error.

Referring to FIG. 1, a solid outline representing a top-down view of a portion of a mine is shown. The dashed outline represents a map created using a mobile scanner exhibiting drift error. This map is aligned (georeferenced), but still contains drift error.

The method of the invention includes two phases: (i) a control point profiling, and (ii) nonrigid transformation. The advantage of nonrigid transformation is that it may be used for georeferencing and/or error correction while rigid transformation may be used for georeferencing only. Each of the above two phases is now described more fully.

Control point (tag) profiling is the process of visiting each control point with a laser scanner and recording a "snapshot" of the local area. This part of the process therefore obtains a set of easily-recognizable and globally-positioned landmarks that can be used to georeference subsequently scanned data. For each control point:
1. a laser scanner is precisely aligned with a control point (e.g., a scanner-mounted laser pointer can be used to position the scanner so that it is directly beneath the control point);
2. the sensor data observed by the laser scanner is recorded while it is still precisely positioned (often referred to as a "snapshot" of the local environment)
3. the sensor data snapshot is saved (e.g., in the form of a "tag database" that allows easy retrieval of snapshots in any order at a later time).

Near each control point, an RFID tag is preferably installed which is easily and uniquely recognized when the laser scanner is nearby. The RFID tag's unique ID is included in the snapshot and is used to index the database. The snapshots additionally contain laser data as observed from the precisely-aligned position beneath the control point.

Later, when all the scan data is acquired for an area, the database can be used to establish correspondences between points in the scan data and points in the real world. Laser data acquired during the scan is compared with saved laser snapshot data to establish precise offsets between laser scanner positions and the known control points. The RFID tags are needed because many areas in the scan may look similar, and installed tags can easily disambiguate them by having a unique serial number.

While the present invention preferably uses at least one laser scanner and at least two RFID tags, these could be replaced with other technologies to achieve the same result.

Other technologies that could be used include Wi-Fi access points (which are also uniquely identifiable), bar codes used with a bar code reader, and numbers painted on a mine wall with a calibrated camera that could recognize them. In addition, retro-reflective LIDAR targets, sonar, radar, flash LIDAR, and MEMS LIDAR, or any other similar technology could be used.

After the control point (tag) profiling is completed, mobile LIDAR scanning is performed in the area to create 3D point cloud data, then nonrigid registration is performed in which the collected 3D point cloud data is aligned with the control points. In general, the nonrigid registration comprises two steps: a control point association search and registration.

Figure 2:
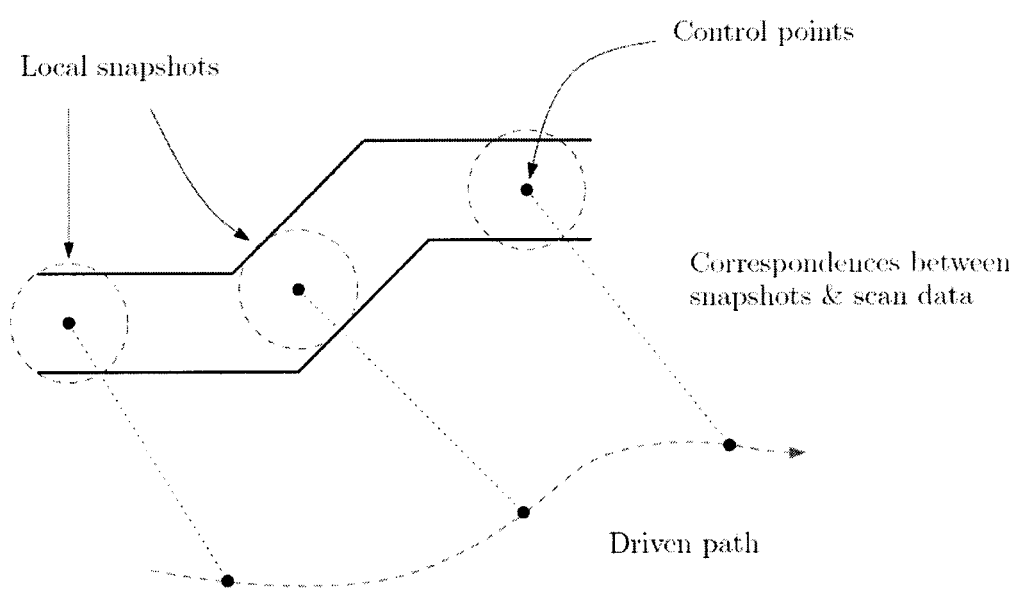
FIG. 2 shows correspondences between saved snapshots and collected scan data.

First, a search is performed to generate the correspondences shown in FIG. 2. As shown in FIG. 2, the local snapshots each store sensor data as acquired while precisely aligned with the control points. After acquiring a mobile scan of the area, correspondences are established between points in that scan and the local snapshots by identifying unique features. These correspondences are then used to relate the known control point coordinates to points on the driven path.

At each point in time during the scan, if an RFID tag was observed, that tag ID is located within the database. If it is found in the database, this means that the scanner was within read range of the tag at that time, within approximately 5 m. To obtain an even more accurate position relative to the known control point, the laser data acquired at this point in time is compared to that stored in the relevant snapshot using a feature-matching routine based on iterative closest point ("ICP"; an algorithm used for matching laser scans) to more precisely estimate the relative offset from the known point based on matching the laser data. While ICP is preferred, other feature matching algorithms could be used instead. If successful, a correspondence between the laser scanner's location at this point in time and a known point in real world coordinates is established.

After searching for associations using the process outlined above, a large set of scanner position and headings, representing the scanner's position and orientation at each point in time (in local coordinates), and a smaller set of correspondences exists. These correspondences establish real-world coordinates for a subset of the scanner position and headings. The next step is registration, which refers to the process of estimating the global position and orientation of the scanner at each point in time, in global (real-world) coordinates, given the information above.

With the set of correspondences, a "best fit" transformation is applied to all position and heading data in the set. This, however, while having the effect of bringing position and coordinates into the georeferenced (real-world) frame, does not have any effect on correcting the accumulated drift error. For example, if scanning the straight path from control point A to B yields a path of length 11 m, but the control points are known to be separated by 10 m, a correction should be applied to all position and heading data from the scan to adjust its length to match.

To both georeference the scan and use the relative information between the control points to correct the error, a nonrigid registration method is used. This begins by using a rigid alignment as described above to approximately align the set of positions and headings (poses). A best-fit transformation is computed by applying a least-squares method to the set of control point correspondences, and this transformation is then applied to each position and heading in the scan path. The result is a new path that is a rotated and translated copy of the original, but not stretched or distorted. As noted above, this represents the original scan data (including drift error) moved into the georeferenced frame, and is a good starting point for the nonrigid (error-correcting) registration process.

Figure 3:
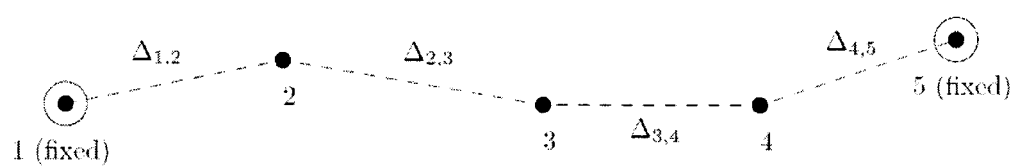
FIG. 3 illustrates a set of position and headings visited by a laser scanner during a scan.

The nonrigid registration step is formulated as an optimization problem that aims to minimize the sum of the squared error of the entire set of poses (i.e. it is a least-squares method). Referring to FIG. 3, a sequence of poses visited by the scanner, with two fixed endpoints is shown. The fixed points 1 and 5 are known by association with surveyed control points, and the remaining position and headings 2, 3, and 4 are known only relative to the fixed endpoints. The deltas $\Delta_{i,j}$ are the relative transitions from position and heading i to position and heading j as measured by the scanner.

The goal is to fix poses 1 and 5 in place, while allowing the others to move freely into their "best fit" positions. This is done by defining an objective function:

$$f = \sum_n (\Delta_{i,j} - \widehat{\Delta_{i,j}})^2, \qquad (1)$$

which is the sum of the squared difference between each measured delta $\Delta_{i,j}$ and $\widehat{\Delta_{i,j}}$, which is the delta that would be measured with poses i and j in their current positions. By varying the set of positions and headings (except the fixed points) and attempting to find the set which minimizes Equation (1), a set of positions and headings that is both fixed in place by the known coordinates, and simultaneously is the best fit to the measured data is obtained.

With the optimization problem defined, a heuristic method is used to find a set of position and headings that satisfies the constraints. This position and heading set represents the actual path travelled by the laser scanner in the external coordinate system. Knowing the path travelled by the laser scanner, the laser measurements are then projected into this space, resulting in a georeferenced point cloud.

The method and system of the present invention may be used for rapid surveying of long sections of underground tunnels (i.e., kilometers), allowing for analyses such as dimensioning (tunnel measurements), horizontal and/or vertical clearance calculations, clash detection for new equipment and/or infrastructure; regular scanning of the same area of an underground tunnel over time, and comparisons of the data sets to detect physical changes in tunnel condition, shape, and profile (e.g. physical changes due to tunnel wall damage from equipment over time, tunnel convergence over time, rock support degradation, etc.); or feature identification and extraction from at least one of a geological data set, a geotechnical data set, and an infrastructure data set.

The scope of the claims should not be limited by the preferred embodiments set forth in the examples, but should be given the broadest interpretation consistent with the description.

The invention claimed is:

1. A method for georeferencing underground geometric data of an underground structure within which global positioning system (GPS) signals are not available, the method comprising:
obtaining, by scanning using a mobile scanner, information about each of at least two control points of the underground structure;

recording the information about the at least two control points using a computer processor, the at least two control points being respectively associated with electronically identifiable tags that are physically present in the underground structure and spatially separated from each other in a path direction of the underground structure;

creating 3D point cloud data from other scanned data of the underground structure; and aligning the 3D point cloud data corresponding to the other scanned data based on the recorded information.

2. The method according to claim 1, wherein said aligning the 3D point cloud data corresponding to the other scanned data based on the recorded information includes finding a best fit of the other scanned data.

3. The method according to claim 2, wherein said finding the best fit of the other scanned data comprises applying a least-squares method to the other scanned data.

4. The method according to claim 1, wherein said obtaining the information using the mobile scanner includes using at least two radio-frequency identification (RFID) tags as said electronically identifiable tags.

5. The method according to claim 1, wherein said obtaining the information using the mobile scanner includes using at least two of the following as said electronically identifiable tags RFID tags; retro-reflective LIDAR targets; Wi-Fi access points; and bar codes and a bar code reader, flash sonar, calibrated cameras, radar, LIDAR, or MEMS LIDAR as part of the mobile scanner.

6. The method according to claim 1, wherein the information obtained using the mobile scanner includes position information (X,Y,Z coordinates) of each of the at least two control points of the underground structure.

7. The method according to claim 1, wherein said obtaining the information using the mobile scanner includes electronically identifying when the mobile scanner is within a predetermined range of each of the at least two control points using signals provided from the mobile scanner to respective ones of the electronically identifiable tags that are respectively positioned in the underground structure in association with the at least two control points.

8. The method according to claim 1, wherein the at least two control points comprise at least three control points and the mobile scanner is a mobile laser scanner.

9. The method according to claim 1, wherein said aligning the 3D point cloud data corresponding to the other scanned data based on the recorded information includes a non-rigid registration process having a control point association phase followed by a registration phase.

10. The method according to claim 1, wherein said aligning the 3D point cloud data corresponding to the other scanned data based on the recorded information includes correcting accumulated drift error.

11. The method according to claim 1, wherein said aligning the 3D point cloud data corresponding to the other scanned data based on the recorded information includes performing a rigid alignment process followed by a non-rigid alignment process.

12. A system for georeferencing underground data, the system comprising:

a mobile sensor configured to obtain information about each of at least two control points of the underground structure; and a computer processor configured to:

record the information about the at least two control points, the at least two control points being respectively associated with electronically identifiable tags that are physically present in the underground structure and spatially separated from each other in the underground structure, and align other sensed data of the underground structure to the recorded information, wherein the aligning includes a rigid alignment process followed by a non-rigid alignment process.

13. The system according to claim 12, wherein the aligning of the other sensed data of the underground structure based on the recorded information includes finding a best fit of the other sensed data.

14. The system according to claim 13, wherein the aligning of the other sensed data of the underground structure based on the recorded information comprises applying a least-squares method to the other sensed data.

15. The system according to claim 12, further comprising at least two radio-frequency identification (RFID) tags as the electronically identifiable tags adapted to be respectively positioned in the underground structure in association with the at least two control points.

16. The system according to claim 12, wherein further comprising at least two of the following elements as the electronically identifiable tags: RFID tags; retro-reflective targets; Wi-Fi access points; and bar codes, and a bar code reader; sonar; calibrated cameras; radar; flash LIDAR; or MEMS LIDAR as the mobile sensor or part of the mobile sensor.

17. The system according to claim 12, wherein the information obtained using the mobile sensor includes position information of each of the at least two control points.

18. The system according to claim 12, wherein the mobile sensor is a mobile LIDAR scanner, and wherein the computer processor is configured to electronically identify when the mobile LIDAR scanner is within a predetermined range of each of the at least two control points using signaling between the mobile LIDAR scanner and each of the electronically identifiable tags positioned in association with the at least two control points.

19. The system according to claim 12, wherein the computer processor is configured to, after the information about the at least two control points is recorded, create 3D point cloud data from the other sensed data of the underground structure.

20. The system according to claim 12, wherein the obtained information about each of at least two control points of the underground structure is obtained from a same scan as the other sensed data of the underground structure.

21. A system for georeferencing underground data, the system comprising:

memory; and processing circuitry operatively coupled to the memory, the processing circuitry being configured to:

receive laser scanning data associated with a scan of an underground structure within which global positioning system (GPS) signals are not available, create 3D point cloud data of the underground structure using the received laser scanning data, and align, using non-rigid registration, the 3D point cloud data of the underground structure using at least two identifiable control points of the underground structure.

22. The system according to claim 21, wherein the aligning includes drift error correction processing.

* * * * *